(12) United States Patent
Susuki et al.

(10) Patent No.: US 12,365,804 B2
(45) Date of Patent: Jul. 22, 2025

(54) VINYL CHLORIDE-BASED RESIN EMULSION, WATER-BASED INK, AND RECORDING PAPER

(71) Applicant: NISSIN CHEMICAL INDUSTRY CO., LTD., Echizen (JP)

(72) Inventors: Yudai Susuki, Echizen (JP); Yasuhiro Mitta, Echizen (JP); Takashi Kimura, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 563 days.

(21) Appl. No.: 17/430,934

(22) PCT Filed: Feb. 13, 2020

(86) PCT No.: PCT/JP2020/005566
§ 371 (c)(1),
(2) Date: Aug. 13, 2021

(87) PCT Pub. No.: WO2020/166660
PCT Pub. Date: Aug. 20, 2020

(65) Prior Publication Data
US 2022/0127476 A1     Apr. 28, 2022

(30) Foreign Application Priority Data

Feb. 15, 2019   (JP) ................................. 2019-025376

(51) Int. Cl.
| | | |
|---|---|---|
| C09D 11/02 | (2014.01) |
| B41M 5/52 | (2006.01) |
| C08F 283/02 | (2006.01) |
| C09D 11/023 | (2014.01) |
| C09D 11/102 | (2014.01) |
| C09D 151/08 | (2006.01) |

(52) U.S. Cl.
CPC ......... *C09D 11/023* (2013.01); *B41M 5/5254* (2013.01); *C08F 283/02* (2013.01); *C09D 11/102* (2013.01); *C09D 151/08* (2013.01)

(58) Field of Classification Search
CPC .. C09D 11/023; C09D 11/102; C09D 151/08; B41M 5/5254; C08F 283/02
USPC ....................................................... 428/32.1
See application file for complete search history.

(56) References Cited

U.S. PATENT DOCUMENTS

| | | |
|---|---|---|
| 5,147,926 A | 9/1992 | Meichsner et al. |
| 2011/0124801 A1 | 5/2011 | Mitta et al. |
| 2013/0331504 A1 | 12/2013 | Mitta et al. |
| 2022/0127476 A1* | 4/2022 | Susuki ............... C08F 283/02 |

FOREIGN PATENT DOCUMENTS

| | | | | |
|---|---|---|---|---|
| JP | 53-61412 A | 6/1978 | | |
| JP | 54-89811 A | 7/1979 | | |
| JP | 55-51583 A | 4/1980 | | |
| JP | 55-65269 A | 5/1980 | | |
| JP | 56-84992 A | 7/1981 | | |
| JP | 56-148584 A | 11/1981 | | |
| JP | 58-24493 A | 2/1983 | | |
| JP | 61-235478 A | 10/1986 | | |
| JP | 62-288076 A | 12/1987 | | |
| JP | 2-238015 A | 9/1990 | | |
| JP | 4-41517 A | 2/1992 | | |
| JP | 05-140243 A | * | 6/1993 | ............ C08F 283/00 |
| JP | 8-253716 A | 10/1996 | | |
| JP | 9-12956 A | 1/1997 | | |
| JP | 10-176132 A | 6/1998 | | |
| JP | 11-35866 A | 2/1999 | | |
| JP | 11-123867 A | 5/1999 | | |
| JP | 2001-199152 A | 7/2001 | | |

(Continued)

OTHER PUBLICATIONS

Japanese Notice of Reasons for Refusal for Japanese Application No. 2020-572308, dated May 17, 2022, with an English translation.
International Search Report, issued in PCT/JP2020/005566, PCT/ISA/210, dated Apr. 21, 2020.
Written Opinion of the International Searching Authority, issued in PCT/JP2020/005566, PCT/ISA/237, dated Apr. 21, 2020.

*Primary Examiner* — Betelhem Shewareged
(74) *Attorney, Agent, or Firm* — Birch, Stewart, Kolasch & Birch, LLP

(57) ABSTRACT

The present invention provides: a vinyl chloride-based resin emulsion of a polymerization product composed of (A) a polycarbonate urethane oligomer having a number average molecular weight of 5,000 to 50,000 and (B) a monomer composition containing a vinyl chloride monomer, wherein the polycarbonate urethane oligomer (A) having a number average molecular weight of 5,000 to 50,000 is contained in an amount of 40 to 500 parts by mass relative to 100 parts by mass of the monomer composition (B) containing a vinyl chloride monomer; and a method for producing the vinyl chloride-based resin emulsion. The vinyl chloride-based resin emulsion according to the present invention can exhibit excellent water resistance, moisture resistance, high gloss, alcohol resistance, close adhesiveness and film formability at ambient temperature when used in a water-based ink, and can exhibit excellent color developability, water resistance, moisture resistance, color visibility, high gloss and close adhesiveness when used in recording paper, and therefore can be used effectively in a binder for an ink, a coating material and an inorganic substance dispersion, an absorption layer in recording paper, a fiber treating agent, wallpaper in medical facilities and the like.

5 Claims, No Drawings

(56) References Cited

FOREIGN PATENT DOCUMENTS

| | | |
|---|---|---|
| JP | 2016-166274 A | 9/2016 |
| WO | WO 2010/140647 A1 | 12/2010 |
| WO | WO 2012/128138 A1 | 9/2012 |

* cited by examiner

VINYL CHLORIDE-BASED RESIN EMULSION, WATER-BASED INK, AND RECORDING PAPER

TECHNICAL FIELD

This invention relates to a vinyl chloride-based resin emulsion which may be advantageously utilized as a binder for ink, paint, inorganic dispersion or the like, a receiving layer for recording sheets, a fabric treating agent, and the like. More particularly, it relates to a vinyl chloride-based resin emulsion which exhibits excellent water resistance, humidity resistance, high gloss, alcohol resistance, adhesion strength, and normal temperature film formation when used in aqueous ink, and excellent color development, humidity resistance, color visual perception, high gloss, and adhesion when used in recording sheets.

BACKGROUND ART

Reference is first made to gravure printing ink. In general printing, printing quality depends on the printability and printing effect of printing ink. The printability is a set of properties relating to a behavior of ink from transfer of ink on a printing machine to an object to be printed to completion of a printed surface, the properties mainly including fluidity, interfacial compatibility, and drying of ink. On the other hand, the printing effect is the finish of printing that the ink having formed a printed surface develops, including such properties as color tone, gloss, water resistance, blocking resistance, and the like. Ink is basically composed of a coloring matter (dye or pigment), vehicle, and auxiliary agents (flow adjusting agents, drying adjusting agents, etc.). Of these, the vehicle has the most impact on the printability and printing effect. The vehicle is basically composed of a binder, wax, solvent, and the like. By a choice of the binder, the nature of the vehicle is substantially changed, on which the printability and printing effect largely depend.

The binders are generally classified into solvent binders and aqueous binders. The solvent binders include urethane resins as proposed in JP-A H09-012956 (Patent Document 1). Nowadays, however, the considerations of air pollution, fire risk, and working hygiene turn attention to the aqueous binders not using organic solvents.

The aqueous binders are generally divided into alkali-soluble resins as typified by styrene-acrylic resins, water-soluble resins as typified by polyvinyl alcohol, and water-dispersed resins as typified by urethane emulsions (Patent Document 2: JP-A H02-238015) and acrylic emulsions.

In general, in the case of printing using an aqueous ink comprising a water-dispersed resin as the binder, the ink is applied onto a printing surface of a printer at room temperature, and thereafter finished by drying at or above the glass transition temperature of the water-dispersed resin. When heated at or above the glass transition temperature, overall resin particles fuse together to form a uniform film which develops and improves water resistance. With attention paid to drying on the printer among printability factors, the printing ink must maintain fluidity on the printer for as long a time as possible without drying. In this regard, the solvent type resin, alkali-soluble resin, and water-soluble resin are non-problematic in that even if the resin once becomes a dry film, the resin resumes original fluidity when dissolved in a solvent, alkaline aqueous solution or water, whereas the water-dispersed resin is problematic in that once the resin is dry so that resin particles fuse together at their surface, the resin does not resume fluidity even when contacted with water, leading to a failure of printing. On the other hand, the alkali-soluble resin has a problem of poor alkali resistance and the water-soluble resin has a problem of poor water resistance. Then conventional binders are sometimes prepared by combining the alkali-soluble resin or water-soluble resin with the water-dispersed resin. In the state-of-the-art, an attempt to improve printability encounters a loss of alkali or water resistance while an attempt to improve alkali or water resistance leads to insufficient printability.

To solve the problem, JP-A H10-176132 (Patent Document 3) proposes a binder for aqueous ink comprising a monomer selected from vinyl chloride, alkyl (meth)acrylates having an alkyl moiety of 1 to 18 carbon atoms, and monoalkenylbenzenes, a monomer selected from ethylenically unsaturated monomers having a functional group, and another ethylenically unsaturated monomer. However, problems remain with respect to humidity resistance and gloss.

Also fluoroplastics are proposed in Patent Document 4: JP-A H11-035866. Although fluoroplastics are excellent in many aspects including weather resistance and corrosion resistance, a cost problem is inevitably left unsolved.

Reference is now made to inkjet ink. The inkjet recording system is excellent in quietness, recording speed, print quality, and running cost, and is generally on widespread use. For use in this system, an aqueous ink is selected from the aspects of ink physical properties, safety, and ease of handling. Ink compositions having a water-soluble dye such as an acidic dye, direct dye or basic dye, dissolved in a glycol-based solvent and water are known from Patent Documents 5 to 7: JP-A S53-061412, JP-A S54-089811, and JP-A S55-065269. They have the drawback of poor water resistance.

Thus the use of pigments as the coloring component is under investigation. To disperse the pigment, acrylic resins or styrene-acrylic resins having carboxy groups incorporated therein (Patent Document 8: JP-A S61-235478) and aqueous resins in the form of ternary copolymers of acrylic acid, styrene, and α-methylstyrene (Patent Document 9: JP-A H08-253716) are used. Although improvements in water resistance and weather resistance are noticeable, there is left room for improvement in dispersion (change with time) of pigments.

Next, reference is made to the receiving layer of recording sheets, especially of inkjet recording sheets. Currently the recording system using aqueous ink is often employed in the printer in the business machine system including personal computers, and accordingly the demand for recording material suited for that system is increasing. Meanwhile, a recording material having better characteristics is required in order to achieve further improvements in quality, colorfulness, appearance, and images. The recording material is used in diversified applications while requirements of properties such as water resistance and color development become increasingly stricter. The receiving layer is proposed in a recording sheet in which amorphous silica and a polymeric binder such as polyvinyl alcohol are combined and coated on a base paper (Patent Document 10: JP-A S55-051583) and a recording sheet comprising a base paper provided on front and back surfaces with an ink receiving layer containing porous pigment particles (Patent Document 11: JP-A S56-148584). Although a significant improvement in colorfulness or sharpness is achieved as compared with conventional recording sheets using woodfree paper, these receiving layers have the problems that a reduced coating weight allows for irregular spread of ink, resulting in printed images with substantial bleeding and that with an increased coating weight, bleeding is reduced, but the coating layer tends to spall off, causing dusting.

Patent Document 12: JP-A S62-288076 proposes a recording sheet in which binding strength is improved using a water-insoluble resin obtained from reaction of polyvinyl alcohol with acrylic acid and methyl methacrylate. Since this water-insoluble resin is anionic, fixation of an aqueous ink which is also anionic is adversely affected, failing to provide a solution capable of preventing ink bleeding or improving water resistance.

Further proposed are a recording sheet comprising a polycation polymeric electrolyte (Patent Document 13: JP-A S56-084992), a recording sheet comprising an ink receiving layer composed mainly of an ink-adsorbing cationic polymer binder (Patent Document 14: JP-A S58-024493), and a recording sheet comprising a cationic acrylic resin emulsion (Patent Documents 15 and 16: JP-A H11-123867 and JP-A 2001-199152). These proposals are not necessarily satisfactory with respect to color development and water resistance.

PRIOR ART DOCUMENTS

Patent Documents

Patent Document 1: JP-A H09-012956
Patent Document 2: JP-A H02-238015
Patent Document 3: JP-A H10-176132
Patent Document 4: JP-A H11-035866
Patent Document 5: JP-A S53-061412
Patent Document 6: JP-A S54-089811
Patent Document 7: JP-A S55-065269
Patent Document 8: JP-A S61-235478
Patent Document 9: JP-A H08-253716
Patent Document 10: JP-A S55-051583
Patent Document 11: JP-A S56-148584
Patent Document 12: JP-A S62-288076
Patent Document 13: JP-A S56-084992
Patent Document 14: JP-A S58-024493
Patent Document 15: JP-A H11-123867
Patent Document 16: JP-A 2001-199152

SUMMARY OF INVENTION

Technical Problem

An object of the invention, which has been made under the above-mentioned circumstances, is to provide a vinyl chloride-based resin emulsion which exhibits excellent water resistance, humidity resistance, high gloss, alcohol resistance, adhesion, and normal temperature film formation when used in aqueous ink, and excellent color development, water resistance, humidity resistance, color visual perception, high gloss, and adhesion when used in recording sheets.

Solution to Problem

Making extensive investigations to attain the above object, the inventors have found that the outstanding problems can be overcome by a vinyl chloride-based resin emulsion which is obtained from emulsion polymerization of (A) 40 to 500 parts by weight of a urethane oligomer having a number average molecular weight of 5,000 to 50,000 with (B) 100 parts by weight of a monomeric composition containing a vinyl chloride monomer. The invention is predicated on this finding.

Accordingly, the invention provides a vinyl chloride-based resin emulsion, an aqueous ink, a recording sheet, and a method for preparing the vinyl chloride-based resin emulsion, as defined below.

1. A vinyl chloride-based resin emulsion comprising a polymer of (A) a polycarbonate-based urethane oligomer having a number average molecular weight of 5,000 to 50,000 with (B) a monomeric composition containing a vinyl chloride monomer wherein 40 to 500 parts by weight of the polycarbonate-based urethane oligomer (A) is present per 100 parts by weight of the monomeric composition (B).
2. An aqueous ink composition comprising the vinyl chloride-based resin emulsion of 1.
3. A recording sheet comprising a coating of the vinyl chloride-based resin emulsion of 1.
4. A method for preparing a vinyl chloride-based resin emulsion, comprising the step of effecting emulsion polymerization of (A) 40 to 500 parts by weight of a polycarbonate-based urethane oligomer having a number average molecular weight of 5,000 to 50,000 with (B) 100 parts by weight of a monomeric composition containing a vinyl chloride monomer.

Advantageous Effects of Invention

The vinyl chloride-based resin emulsion of the invention exhibits excellent water resistance, humidity resistance, high gloss, alcohol resistance, adhesion, and normal temperature film formation when used in aqueous ink, and excellent color development, water resistance, humidity resistance, color visual perception, high gloss, and adhesion when used in recording sheets. Thus the emulsion may be advantageously utilized as a binder for ink, paint, inorganic dispersion or the like, a receiving layer for recording sheets, a fabric treating agent, wallpaper in medical facilities, and the like.

DESCRIPTION OF EMBODIMENTS

Now the invention is described in detail.

While the invention pertains to a vinyl chloride-based binder for aqueous ink, it is a vinyl chloride-based resin emulsion obtained from emulsion polymerization of (A) 40 to 500 parts by weight of a polycarbonate-based urethane oligomer having a number average molecular weight of 5,000 to 50,000 with (B) 100 parts by weight of a monomeric composition containing a vinyl chloride monomer.

As component (A) or polycarbonate-based urethane oligomer, any commercially available products may be used. Examples include ETERNACOLL UW-1005E (UBE Industries, Ltd.), HYDRAN WLS-207 and HYDRAN WLS-230 (DIC Corp.), but are not limited thereto. The oligomers may be used alone or in admixture of two or more.

The amount of component (A) blended should preferably be in the range of 40 to 500 parts by weight, more preferably 100 to 300 parts by weight per 100 parts by weight of (B) a monomeric composition containing a vinyl chloride monomer. If the amount is less than 40 parts by weight, problems like formation of agglomerates may arise. If the amount exceeds 500 parts by weight, problems like inactivated reaction and a failure of consistent production may arise.

The polycarbonate-based urethane oligomer (A) should preferably have a number average molecular weight (Mn) of 5,000 to 50,000, more preferably 8,000 to 25,000. If the Mn of the urethane oligomer is less than 5,000, problems like formation of agglomerates may arise. If the Mn exceeds 50,000, problems like mass formation of agglomerates and at worst, gelation may arise. It is noted that the Mn is measured by gel permeation chromatography (GPC) versus polystyrene standards. In the disclosure, those compounds having a Mn of up to 50,000 are referred to as oligomers.

Component (B) used herein is a monomeric composition containing a vinyl chloride monomer. In the monomeric composition, a vinyl chloride monomer may be used alone as the monomeric component. Alternatively, a mixture of a vinyl chloride monomer and (C) an ethylenically unsaturated monomer copolymerizable therewith may be used.

Examples of the ethylenically unsaturated monomer (C) copolymerizable with a vinyl chloride monomer include vinyl acetate, ethylene, propylene, and vinylidene chloride, as well as vinyl carboxylate monomers such as vinyl propionate; aromatic vinyl monomers such as styrene and α-methylstyrene; conjugated diene monomers such as 1,3-butadiene and 2-methyl-1,3-butadiene; ethylenically unsaturated monocarboxylic acid esters such as methyl acrylate, ethyl acrylate, butyl acrylate, 2-ethylhexyl acrylate, and methyl methacrylate; ethylenically unsaturated polycarboxylic acid esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid and fumaric acid; epoxy-containing monomers such as glycidyl methacrylate; alcoholic hydroxy-containing monomers such as 2-hydroxyethyl methacrylate; alkoxy-containing monomers such as methoxyethyl acrylate; nitrile-containing monomers such as acrylonitrile; amide-containing monomers such as acrylamide; amino-containing monomers such as dimethylaminoethyl methacrylate; and monomers having at least two ethylenically unsaturated groups in the molecule, such as divinylbenzene and allyl methacrylate. One or more monomers may be selected from the foregoing. Inter alia, vinyl acetate, ethylenically unsaturated monocarboxylic acid esters, and ethylenically unsaturated monocarboxylic acids are preferred.

A proportion of vinyl chloride monomer (B) to copolymerizable ethylenically unsaturated monomer (C) is preferably between 50:50 and 100:0, more preferably between 70:30 and 100:0, in weight ratio. Too low a proportion of vinyl chloride may lead to the disadvantage of formation of agglomerates.

For the emulsion polymerization, any well-known emulsion polymerization techniques may be used. The monomer(s), the polycarbonate-based urethane oligomer, and polymerization aids (e.g., emulsifiers such as alkyl sulfuric acid ester salts, polymerization initiators such as ammonium persulfate, chain transfer agents such as mercaptans, pH adjusting agents such as sodium carbonate, and defoamers) may be initially added in a lump or continuously added, or some may be added continuously or in divided portions during polymerization.

A nonionic surfactant or anionic emulsifier may be used together insofar as the desired effects of the invention are not compromised. Exemplary surfactants include polyoxyethylene alkyl phenyl ethers, polyoxyethylene alkyl ethers, polyoxyethylene fatty acid esters, sorbitan fatty acid esters, polyoxyethylene sorbitan fatty acid esters, polyoxyalkylene alkyl ethers, polyoxyethylene derivatives, glycerol fatty acid esters, polyoxyethylene hydrogenated castor oil, polyoxyethylene alkyl amines, alkyl alkanol amides, or acetylene alcohol, acetylene glycol and ethylene oxide adducts thereof.

Examples of the polymerization initiator used in the emulsion polymerization include persulfate salts such as ammonium persulfate and potassium persulfate; azo compounds such as 2,2'-diamidino-2,2'-azopropane dihydrochloride and azobisisobutyronitrile; peroxides such as cumene hydroperoxide, benzoyl peroxide, and hydrogen peroxide; and tartaric acid. Also useful are well-known redox initiators such as potassium persulfate and sodium hydrogen sulfite. The amount of the polymerization initiator used is generally 0.1 to 2.0% by weight, preferably 0.2 to 1.0% by weight based on the monomers.

The temperature at which the emulsion polymerization is carried out is generally in the range of 40 to 80° C., desirably 50 to 70° C. The polymerization time may be determined as appropriate, although it is preferably 10 to 15 hours. Polymerization is desirably carried out in an inert gas atmosphere such as nitrogen gas.

The residue on evaporation is preferably 10 to 50% by weight, more preferably 20 to 40% by weight. If the residue is less than 10% by weight, agglomerates may form. If the residue is more than 50% by weight, a large number of agglomerates may form.

It is noted that at the end of polymerization, a plasticizer, inorganic or organic filler, thickener and the like may be added insofar as the performance of the aqueous ink binder is not compromised.

The inventive vinyl chloride-based resin emulsion obtained from the emulsion polymerization has an average particle size of preferably 10 to 1,000 nm, more preferably 20 to 800 nm and a viscosity at 23° C. of preferably 1 to 1,800 mPa·s, more preferably 5 to 1,000 mPa·s.

While the inventive vinyl chloride-based resin emulsion obtained from the emulsion polymerization may be used in a variety of applications, it exhibits excellent color development, water resistance, humidity resistance, high gloss, adhesion, and normal temperature film formation when used in recording sheets, and excellent water resistance, humidity resistance, color visual perception, high gloss, alcohol resistance, and adhesion when used in aqueous ink.

When the vinyl chloride-based resin emulsion is used in aqueous ink, an ink composition may be prepared by blending the vinyl chloride-based resin emulsion with a colorant, a water-soluble organic solvent, various additives, water, and the like, and dispersing and mixing on a well-known dispersing machine, mixer, kneader or mill. The content of the vinyl chloride-based resin emulsion in the aqueous ink composition is preferably 2 to 30% by weight, more preferably 5 to 20% by weight, calculated as solids. The colorant used herein may be dyes, pigments or the like, and is preferably present in an amount of 5 to 40% by weight, more preferably 3 to 30% by weight of the aqueous ink composition. Examples of the water-soluble organic solvent include ethylene glycol monoether, diethylene glycol monoether, propylene glycol monoether, ethylene glycol dimethyl ether, diethylene glycol dimethyl ether, ethylene glycol, diethylene glycol, propylene glycol, glycerol, methanol, ethanol, isopropyl alcohol, methyl ethyl ketone, methyl cellosolve, ethyl cellosolve, acetone, ethyl acetate, and diacetone alcohol. The water-soluble organic solvent is preferably present in an amount of 0 to 60% by weight, more preferably 0 to 50% by weight of the aqueous ink composition. Water is preferably present in an amount of 5 to 95% by weight, more preferably 10 to 90% by weight of the aqueous ink composition. Suitable additives include pigment dispersants, leveling agents, defoamers, and the like, and these additives may be added in standard amounts commonly used in aqueous ink.

When the vinyl chloride-based resin emulsion is used in recording sheets, it is advantageously used to form a receiving layer on recording sheets. A vinyl chloride-based resin emulsion-containing composition which is used to form the receiving layer may comprise a pigment such as amorphous synthetic silica, aluminum silicate, magnesium silicate, precipitated calcium carbonate, heavy calcium carbonate, calcium silicate, aluminum hydroxide, zeolite, fired clay, kaolin clay, talc or white carbon. The pigment is preferably present in an amount of 10 to 90% by weight, more preferably 20 to 80% by weight. Other additives which can be compounded herein include pigment dispersants, defoamers, colorants, antioxidants, UV absorbers, viscosity adjusting agents, parting agents, and the like.

The receiving layer-forming composition may be applied onto a substrate, typically commercially available paper or wallpaper, by a coating means such as a brush, blade coater, air knife coater, curtain coater, Mayer bar coater, gravure coater, or roll coater and dried so as to provide a coating weight of 3 to 25 g/m², calculated as dry polymer solids.

EXAMPLES

Preparation Examples, Examples and Comparative Examples are given below for illustrating the invention, but the invention is not limited thereto. In the following Examples, parts and % are by weight.

Example 1

A polymerization vessel equipped with a stirrer, condenser, thermometer, and nitrogen gas inlet was purged with nitrogen and charged with 44 parts of deionized water, 13 parts of vinyl chloride, and 42 parts (active ingredient 30%) of ETERNACALL UW-1005E (waterborne polycarbonate-based urethane resin by UBE Industries, Ltd.), which were heated at 60° C. with stirring. Further a solution of 0.1 part of ammonium persulfate (initiator) in 1 part of deionized water was added whereupon polymerization reaction was run.

When the internal pressure of the polymerization vessel reached 0 MPa, the residual monomer was removed in vacuum to 1,000 ppm. The vessel was then cooled to 40° C. or below, yielding a polymer emulsion having a solid content of 30%, pH 8.0, and a viscosity of 10 mPa·s at 23° C. as measured by a Brookfield viscometer. The results are listed in Table 1. By GPC, the emulsion was identified to be a vinyl chloride-based resin.

Examples 2 to 7 and Comparative Examples 1 to 8

Vinyl chloride-based resin emulsions were prepared by carrying out polymerization as in Example 1 while using the formulation shown in Tables 1 and 2. The compositions of Comparative Examples 1, 2, 4, 5, 7, and 8 could not be evaluated because agglomerates formed. In Example 3, component (C) was fed along with the vinyl chloride monomer.

[Evaluation Methods]
<Measurement of Solid Content>

A test was carried out by weighing about 1 g of a vinyl chloride-based resin emulsion in an aluminum foil dish, holding the dish in a dryer for heating at 105-110° C. for 1 hour, taking out of the dryer, allowing to cool down in a desiccator, and measuring the weight of the dry sample. A solid content was computed according to the following equation.

$$R = \frac{D-A}{W-A} \times 100 \qquad [\text{Math. 1}]$$

Herein R is a solid content (%),
W is the weight (g) of the aluminum foil dish containing the sample prior to drying,
A is the weight (g) of the aluminum foil dish, and
D is the weight (g) of the aluminum foil dish containing the dry sample.

Note that the aluminum foil dish had a diameter of 70 mm and a height of 12 mm.

<pH Measurement>

A vinyl chloride-based resin emulsion was directly measured for pH by a pH meter according to the pH measurement method of JIS Z8802.

<Viscosity Measurement by Brookfield Viscometer>

A vinyl chloride-based resin emulsion was measured for viscosity by a BM type viscometer (No. 1 rotor, 6 rpm) while maintaining the liquid temperature at 23±0.5° C.

<Average Particle Size>

It was measured by a light scattering particle size meter.

Sample Preparation

1. A sample was weighed in a disposable cup and diluted with deionized water at 25° C.
2. The diluted sample was filtered through a 300-mesh filter cloth.

Liquid temperature: 25° C.
   Number of accumulations: 100
   Number of measurement: 1

Measurement

Once a proper concentration was confirmed, measurement was made under the above conditions.

The result of measurement was confirmed satisfactory.

<Minimum Film Formation Temperature (MFT)>

After aluminum foil was placed on a temperature gradient tester (Rigaku Kogyo K.K.) according to ASTM-2354-65T, the vinyl chloride-based resin emulsion was applied to the foil by a 0.1-mil coater. After 3 hours, the state of film (or coating) formation was observed under a monocular (by PENTAX, 8X30,6°). The temperature at which cracks were observed was determined. The preferred range of MFT is from 0° C. to 20° C.

<Polymerization Stability>

The vinyl chloride-based resin emulsion was coated onto a glass plate by a doctor knife of 6 mils. The coating was visually observed to confirm whether or not agglomerates were present.

○: no agglomerates found
Δ: some agglomerates formed
x: many agglomerates formed I. Evaluation of Performance as Coating The vinyl chloride-based resin emulsion was applied onto a PET film (Lumirror L-75 by Toray Industries, Inc.) by a bar coater No. 4 and dried at 105° C. for 120 seconds.

a. Appearance

The appearance of the coated film obtained under the above conditions was observed with naked eyes and under a microscope (Keyence Corp.) to examine the state of coating and the degree of cissing. Judgment was made according to the following criteria.

○: good substrate wetting and continuous coating
Δ: poor substrate wetting or no continuous coating
x: poor substrate wetting and no continuous coating b. Water Resistance The coated film was set on a color fastness rubbing tester (Yasuda Seiki Seisakusho, Ltd.). Using water-wetted gauze, the rubbing test was carried out 25 cycles. Judgment was made according to the following criteria.

○: no color transfer to gauze
Δ: some color transfer
x: complete color transfer, printed area color faded c. Humidity Resistance The coated film was allowed to stand at 50° C. and humidity 90% for one day, after which it was judged according to the following criteria.

○: no whitening of coating
Δ: local whitening of coating
x: whitening over entire coating d. Alcohol Resistance The coated film was set on a color fastness rubbing tester (Yasuda Seiki Seisakusho, Ltd.). Using gauze wetted with 30% ethanol, the rubbing test was carried out 25 cycles. Judgment was made according to the following criteria.

○: no color transfer to gauze
Δ: some color transfer
x: complete color transfer, printed area color faded e. Adhesion Adhesive tape (Cellotape® by Nichiban Co., Ltd.) was applied to the coated film and pulled back, and judgment was made according to the following criteria.

○: no peel
Δ: some peel
x: complete peel

II. Evaluation of Performance as Ink

To 100 parts of the vinyl chloride-based resin emulsion, 10 parts of carbon black MA100 (Mitsubishi Chemical Corp.) was added and 1 part of OLFINE E1010 (Nissin Chemical Co., Ltd.) as leveling agent added. A 200-mL plastic bottle was charged with the mixture. For the purpose of promoting dispersion, 10 g of zirconia beads having a diameter of 5 mm was added to the bottle. The charge was dispersed for 2 hours using a paint shaker (Asada Iron Works Co., Ltd.), applied by a bar coater No. 36, and dried at 105° C. for 360 seconds. The resulting coating was evaluated.

f. Dispersion (Aging Stability)

After 5 days from the dispersion, the ink was examined for a sharp viscosity buildup, gelation, and sedimentation, with judgment made according to the following criteria.

○: no sharp viscosity buildup, no sediments, and no gelation
Δ: sharp viscosity buildup observed
x: sediments and ink gelation observed g. Dispersion (Particle Uniformity)

The coated article was visually observed under the light and examined for coating unevenness due to secondary particles resulting from poor dispersion. Judgment was made according to the following criteria.

○: neither light leak nor color variation
Δ: local or partial light leak and color variation
x: overall light leak and color variation [0055]

h. Gloss

The coated article was measured for gloss by a gloss meter PG-1M (Nippon Denshoku Industries Co., Ltd.), with a value at 60° being read out. Judgment was made according to the following criteria.

○: gloss value of 30 or higher
Δ: gloss value from 20 to less than 30
x: gloss value of less than 20 i. Lightness

The coated article was measured for lightness (ΔL) by a handy spectrophotometric color difference meter NF333 (Nippon Denshoku Industries Co., Ltd.). Judgment was made according to the following criteria (a lower lightness is better because of black color).

○: lightness (ΔL) of less than 15
Δ: lightness (ΔL) from 15 to less than 18
x: lightness (ΔL) of 18 or higher III. Evaluation of Performance as Wallpaper The vinyl chloride-based resin emulsion was applied onto a vinyl chloride-based raw wallpaper by a bar coater No. 36 and dried at 105° C. for 360 seconds. The resulting coating was evaluated.

j. Adhesion (Wallpaper)

Adhesive tape (Cellotape® by Nichiban Co., Ltd.) was applied to the coating and pulled back, and judgment was made according to the following criteria.

○: no peel
Δ: some peel
x: complete peel

TABLE 1

| | Components (pbw) | Example 1 | 2 | 3 | 4 | 5 | 6 | 7 |
|---|---|---|---|---|---|---|---|---|
| (A) | ETERNACALL UW-1005E | 100 | 185 | 100 | 80 | 400 | | |
| | HYDRAN WLS-213 | | | | | | 100 | 300 |
| (B) | Vinyl chloride | 100 | 100 | 60 | 100 | 100 | 50 | 100 |
| (C) | Ethyl acrylate | | | 35 | | | 50 | |
| | Acrylic acid | | | 5 | | | | |
| Emulsifier | Noigen XL-6190 | | | | | | | |
| | Pelex SS-L | | | | | | | |
| Solid content (%) | | 30 | 30 | 30 | 27 | 30 | 30 | 30 |
| pH | | 8.5 | 8.5 | 8.0 | 8.5 | 9.0 | 8.0 | 8.5 |
| Viscosity (mPa·s) | | 10 | 10 | 10 | 10 | 10 | 10 | 10 |
| Average particle size (nm) | | 100 | 100 | 100 | 120 | 90 | 70 | 50 |
| MFT (° C.) | | 0 | 0 | 0 | 0 | 0 | 20 | 20 |
| Polymerization stability | | ○ | ○ | ○ | Δ | ○ | ○ | ○ |
| Performance I evaluation | a. Appearance | ○ | ○ | ○ | ○ | ○ | ○ | ○ |
| | b. Water resistance | ○ | ○ | ○ | ○ | ○ | ○ | ○ |
| | c. Humidity resistance | ○ | ○ | Δ | ○ | ○ | Δ | ○ |
| | d. Alcohol resistance | ○ | ○ | ○ | ○ | ○ | ○ | ○ |
| | e. Adhesion | ○ | ○ | ○ | ○ | ○ | ○ | ○ |
| II | f. Dispersion (aging stability) | ○ | ○ | ○ | ○ | Δ | Δ | Δ |
| | g. Dispersion (particle uniformity) | ○ | ○ | ○ | ○ | Δ | Δ | Δ |
| | h. Gloss | ○ | ○ | ○ | ○ | ○ | ○ | ○ |

TABLE 1-continued

|   |   | Components (pbw) | Example 1 | 2 | 3 | 4 | 5 | 6 | 7 |
|---|---|---|---|---|---|---|---|---|---|
|   |   | i. Lightness | ○ | ○ | ○ | ○ | ○ | ○ | ○ |
|   | III | j. Adhesion (wallpaper) | ○ | ○ | ○ | ○ | ○ | ○ | ○ |

Note:
The amounts (pbw) of components (A) to (C) are calculated as solids.

TABLE 2

|   | Components (pbw) | Comparative Example 1 | 2 | 3 | 4 | 5 | 6 | 7 | 8 |
|---|---|---|---|---|---|---|---|---|---|
| (A) | ETERNACALL UW-1005E | 30 | 525 |   |   |   |   |   |   |
|   | HYDRAN WLS-201 |   |   |   | 25 |   |   |   |   |
|   | ADEKA BONTIGHTER HUX-210 |   |   |   |   | 25 | 100 | 300 |   |
|   | ADEKA BONTIGHTER HUX-232 |   |   |   |   |   |   |   | 100 |
| (B) | Vinyl chloride | 100 | 100 | 100 | 69 | 100 | 100 | 100 | 100 |
| (C) | Ethyl acrylate |   |   |   | 25 |   |   |   |   |
|   | Acrylic acid |   |   |   | 6 |   |   |   |   |
| Emulsifier | Noigen XL-6190 |   |   |   | 3 |   |   |   |   |
|   | Pelex SS-L |   |   |   | 3 |   |   |   |   |
| Solid content (%) |   | — | — | 25 | — | — | 22.7 | — | — |
| pH |   | — | — | 5.0 | — | — | 8.0 | — | — |
| Viscosity (mPa · s) |   | — | — | 50 | — | — | 10 | — | — |
| Average particle size (nm) |   | — | — | 120 | — | — | 330 | — | — |
| MFT (° C.) |   | — | — | 80 | — | — | 45 | — | — |
| Polymerization stability |   | X | X | ○ | X | X | Δ | X | X |
| Performance I | a. Appearance | — | — | X | — | — | Δ | — | — |
| evaluation | b. Water resistance | — | — | X | — | — | Δ | — | — |
|   | c. Humidity resistance | — | — | X | — | — | X | — | — |
|   | d. Alcohol resistance | — | — | X | — | — | X | — | — |
|   | e. Adhesion | — | — | X | — | — | X | — | — |
| II | f. Dispersion (aging stability) | — | — | X | — | — | X | — | — |
|   | g. Dispersion (particle uniformity) | — | — | X | — | — | Δ | — | — |
|   | h. Gloss | — | — | Δ | — | — | X | — | — |
|   | i. Lightness | — | — | X | — | — | X | — | — |
| III | j. Adhesion (wallpaper) | — | — | X | — | — | X | — | — |

ETERNACOLL UW-1005E: UBE Industries, Ltd., waterborne urethane oligomer, polycarbonate-based, number average molecular weight 10,000, Tg −30° C.
HYDRAN WLS-213: DIC Corp., waterborne urethane oligomer, polycarbonate based, number average molecular weight 25,000, Tg −30° C.
HYDRAN WLS-201: DIC Corp., waterborne urethane oligomer, polyether based, number average molecular weight 20,000
ADEKA BONTIGHTER HUX-210: ADEKA Corp., waterborne urethane oligomer, polyether based, number average molecular weight 6,000
ADEKA BONTIGHTER HUX-232: ADEKA Corp., waterborne urethane oligomer, polyether based, number average molecular weight 2,000
Noigen XL-6190: DKS Co., Ltd., nonionic emulsifier
Pelex SS-L: Kao Corp., anionic emulsifier

The invention claimed is:

1. A vinyl chloride-based resin emulsion comprising a polymer of (A) a polycarbonate-based urethane oligomer having a number average molecular weight of 8,000 to 25,000 with (B) a monomeric composition containing a vinyl chloride monomer wherein 40 to 500 parts by weight of the polycarbonate-based urethane oligomer (A) is present per 100 parts by weight of the monomeric composition (B), and wherein the vinyl chloride-based resin emulsion has an average particle size of from 10 to 1,000 nm.

2. An aqueous ink composition comprising the vinyl chloride-based resin emulsion of claim 1.

3. A recording sheet comprising a coating of the vinyl chloride-based resin emulsion of claim 1.

4. A method for preparing a vinyl chloride-based resin emulsion, comprising the step of effecting emulsion polymerization of (A) 40 to 500 parts by weight of a polycarbonate-based urethane oligomer having a number average molecular weight of 8,000 to 25,000 with (B) 100 parts by weight of a monomeric composition containing a vinyl chloride monomer, and wherein the vinyl chloride-based resin emulsion has an average particle size of from 10 to 1,000 nm.

5. A vinyl chloride-based resin emulsion comprising a polymer of (A) a polycarbonate-based urethane oligomer having a number average molecular weight of up to 25,000 with (B) a monomeric composition containing a vinyl chloride monomer.

* * * * *